Sept. 2, 1958 R. C. MOORE ET AL 2,850,627
SYSTEM FOR MAINTAINING PREDETERMINED PORTIONS
OF A SIGNAL AT A PREDETERMINED VALUE
Filed Dec. 8, 1952

INVENTORS
ROBERT C. MOORE
GEORGE LESLIE CARSON
BY
Allen V. Hazeltine
ATTORNEY

United States Patent Office 2,850,627
Patented Sept. 2, 1958

2,850,627

SYSTEM FOR MAINTAINING PREDETERMINED PORTIONS OF A SIGNAL AT A PREDETERMINED VALUE

Robert C. Moore, Erdenheim, and George Leslie Carson, Philadelphia, Pa., assignors to Philco Corporation, Philadelphia, Pa., a corporation of Pennsylvania Application December 8, 1952, Serial No. 324,784

13 Claims. (Cl. 250—27)

Our invention relates to improved means for automatically adjusting the D.-C. component of a signal so as to maintain predetermined portions of the waveform thereof at a preselected amplitude level. More particularly it relates to improvements in the stability and reliability of gamma-corrector circuits for use in television systems.

The invention will be described hereinafter with particular reference to gamma-correcting circuits such as those described in an article by E. M. Oliver, appearing at page 1301 of vol. 38 of the Proceedings of the I. R. E., and entitled "A Rooter for Video Signals." However, it will be appreciated that the circuits described hereinafter may be used in any of a variety of different applications for purposes other than those indicated in the above-cited article, and that certain features of the invention are of wide and general applicability.

A gamma-corrector may be described for the present purpose as a device for producing a predetermined type of amplitude-distortion in an applied signal. Such devices are commonly employed in television transmitters, to compensate for undesired amplitude-distortion of an opposite type introduced elsewhere in the system. Such undesired distortion is commonly produced, for example, in a standard television receiver, as a result of the non-linear relationship existing between the light output of the receiver cathode-ray tube and the grid-to-cathode voltage thereof. Typically, this non-linear relationship has the form of a power law function, and, if not compensated for, results in a substantial compression of the gradations of shading in the darker portions of the reproduced image.

To correct for this, the gamma-corrector must provide an inverse type of distortion, by virtue of which the output signal thereof is related by a root function to the input signal applied thereto. Then, through appropriate adjustment of the gamma-corrector circuit parameters, the desired degree of relative compression and expansion of the gradations of shading in the reproduced image may be obtained.

One important requirement imposed upon the gamma-corrector circuit derives from the manner in which the television signal is used to control the image-reproducing tube at the receiver. Since the blanking level of the television signal is normally held substantially at a fixed voltage at the grid of the receiver cathode-ray tube, it is the instantaneous value of the television signal measured from the blanking level which constitutes the input signal to the receiver cathode-ray tube. The light output of the cathode-ray tube is therefore a predetermined power law function of the instantaneous amplitude of the television signal measured from the blanking level. Expressed in other words, the effective gain of the cathode-ray tube has predetermined, different values for different values of the instantaneous amplitude of the applied signal measured with respect to the blanking level and, more particularly, this effective gain becomes progressively greater as the amplitude increases.

To properly pre-compensate for this amplitude-distortion introduced at the receiver, the gamma-corrector must then provide an output signal, measured with respect to its blanking level, which is a predetermined root function of the input signal thereto, also measured with respect to the blanking level thereof. In other words, for each value of the instantaneous amplitude of the television signal, measured with respect to the blanking level, the gamma-corrector should provide a predetermined different value of gain, and, more particularly, the values of gain provided should become progressively less for increasing signal amplitudes, to correct for the non-linearity of the receiver cathode-ray tube. This means that the gamma-corrector should always be in substantially the same reference condition, producing substantially the same reference output voltage and the same reference value of gain, during successive blanking intervals, despite variations in the content of the television image, for example.

The gamma-corrector utilized in typical prior art systems, such as the Oliver circuit mentioned hereinbefore, comprises an amplifier stage employing a pentode vacuum tube and a non-linear plate load circuit therefor, the desired predistorted signal being produced across the non-linear load circuit. The non-linearity of the load circuit is obtained by using the cathode impedance of a triode vacuum tube as the plate load of the pentode. The current through the pentode, and hence through the load tube, is then varied in response to the television signal to be gamma-corrected, and, since the grid-to-cathode voltage of the triode load tube is inherently a root function of the plate current thereof, the desired gamma-corrected signal is obtained from the cathode of the load tube by connecting the grid thereof to a source of fixed bias.

In this operation, the different values of grid-to-cathode voltage of the load tube for different plate currents produce values of load impedance which depend upon plate current, rather than being constant as in a linear circuit, and which in fact become progressively less as the plate current increases, providing the desired falling off of gain with increasing signal amplitude.

From the foregoing it will be apparent that, to provide gamma-correction independent of the content of the television signal, the load tube should be maintained in the same impedance condition during successive blanking intervals, thereby providing the same reference value of gain and the same output voltage during such intervals. To accomplish this, the grid-to-cathode voltage of the load tube should be the same during successive blanking intervals.

In the Oliver circuit there is employed for this purpose a conventional diode clamp connected to the grid of the pentode, which maintains the voltage of this grid substantially constant during blanking intervals. This circuit relies for its operation upon the fact that, provided all of the supply voltages therefor, and the characteristics of all of the elements thereof, remain substantially fixed, the grid voltage of the load tube will remain at a substantially fixed value at all times, and the cathode voltage of the load tube will return to a predetermined, fixed value during blanking intervals, providing the desired fixed grid-to-cathode voltage for the load tube during blanking intervals.

However, such substantial constancy of circuit parameters and supply voltages cannot be provided in a practical embodiment of the Oliver circuit without substantial inconvenience and expense. As has been indicated hereinbefore, the principal source of instability in the circuit lies in the possibility of variations in the value of the grid-to-cathode voltage of the triode load tube during successive blanking intervals. Since the grid of the triode tube is maintained at a nominal fixed potential, changes in the plate voltage of the pentode tube during successive blanking intervals result in variations in this grid-to-cathode voltage, and hence in the gain provided during blanking intervals. Such variations in the plate voltage of the pentode tube are readily produced in response to variations in the positive supply voltage, in the blanking level set at the grid of the pentode tube by the clamp circuit there employed, or in the gain of the pentode tube, any or all of which variations may readily occur in a practical embodiment of the system. In addition, the potential supplied to the grid of the load triode may itself be subject to variation in certain embodiments.

The sensitivity of such prior art gamma-correcting systems to changes in the values of the circuit parameters, or in the voltages supplied thereto, tends to render this particular type of circuit arrangement unreliable or unstable in normal practical operation unless elaborate and expensive means are provided for precisely stabilizing substantially all of the circuit supply voltages.

Accordingly it is an object of our invention to provide an improved circuit arrangement for deriving an output signal having an instantaneous amplitude, measured with respect to a preselected reference level, which is a predetermined function of the instantaneous amplitude of an input signal measured with respect to the same reference level.

Another object is to provide such a circuit arrangement which is characterized by improved stability of operation.

Still another object is to provide a gamma-correcting circuit in which the amount of gamma correction provided is substantially invariant despite appreciable variations in the supply voltages supplied to the circuit.

A further object is to provide such a gamma-correcting circuit in which the output signal therefrom is a predetermined fractional power of the input signal thereto.

It is still another object to provide such a circuit in which the potential at the output terminals thereof is substantially the same, during predetermined time intervals of the input signal, despite variations in the supply voltages for the circuit.

A still further object is to provide a leveling circuit of general utility for maintaining predetermined portions of a signal at a predetermined voltage level.

In accordance with our invention, the above objects are achieved by providing a circuit comprising a signal-translating device having a load impedance associated therewith, which device is responsive to input signals applied thereto to produce corresponding output signals at the high-signal potential end of said load impedance, and by also providing a degenerative, unidirectional, D.-C. feedback path for further controlling the circuit so as to maintain the output signal of the translating device at a substantially constant, predetermined level, during preselected portions of the output signal, through automatic adjustment of the D.-C. component thereof.

In a gamma-corrector for television purposes, the signal-translating device may, in accordance with our invention, be a triode vacuum tube utilized as a current driver, and the non-linear load impedance therefor may be another triode vacuum tube connected with its discharge path in series with that of the driver tube as in the Oliver circuit referred to hereinbefore. The feedback circuit then operates to maintain the cathode voltage of the load tube substantially at a predetermined reference value during blanking intervals by generating a control voltage indicative of departures of the cathode voltage of the load tube in one direction from a predetermined reference value thereof, during blanking intervals in the signal, and by utilizing this control voltage to oppose such departures through control of the D.-C. component of the load tube cathode voltage. To maintain the grid of the load tube at a fixed bias with respect to the cathode voltage thereof during blanking intervals, it is preferably also connected to the feedback circuit, at a point having a potential which differs by substantially a constant amount from the blanking voltage at the cathode of the load tube.

As a result of this arrangement, the gamma-corrector is much more stable, with regard to changes in circuit parameters and supply voltages, than are the prior art circuits. The D.-C. feedback circuit, employed in accordance with the invention, operates directly and positively to hold constant the blanking level at the cathode of the load tube despite substantial variations in the supply voltages or in the image content. Furthermore, the feedback circuit also operates to hold the grid voltage of the load tube substantially at a fixed bias with respect to the blanking level at the load tube cathode, thereby assuring a fixed grid-to-cathode voltage for the load tube during blanking intervals as is required for proper gamma correction.

In a simple embodiment, the feedback circuit may employ a peak detector comprising an asymmetrically-conductive device, such as a diode, and a relatively long time-constant load circuit therefor, together with appropriate connections from the load circuit to a current-controlling electrode of the driver tube and to the grid of the load tube. This simple arrangement is particularly effective when, as in ordinary monochrome television transmissions employing "set up," the blanking level is distinctly beyond any extreme of signal variation due to picture content. However, due to the fact that such a peak detector will ordinarily tend to exert some clipping action upon signals appreciably below the extreme value upon which it is intended to operate, there may be, with this simple arrangement and in certain applications, some tendency toward clipping of portions of the television signal representing darker subject matter in the image.

Therefore, to overcome this difficulty, a preferred embodiment of the invention for television purposes may include means for automatically increasing the diode current during the blanking intervals so as to avoid any clipping of the image-representing signals. In addition, a preferred embodiment also preferably employs a cathode-follower to drive both the feedback network and whatever signal-utilization device is connected to the output terminal of the gamma corrector, so as to improve the frequency response of the system, as will be described in detail hereinafter.

Other objects and features of the invention will become apparent from a consideration of the following detailed description, taken together with the accompanying drawings, in which.

Figure 1:
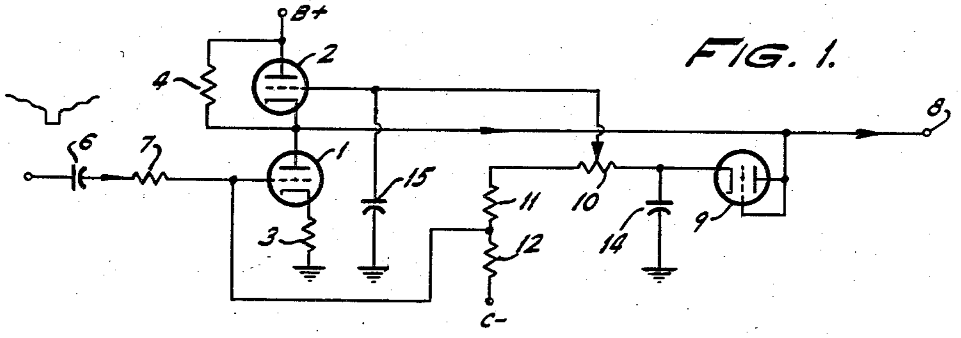
Figure 1 is a schematic diagram of a simplified circuit arrangement embodying our invention.

Referring now to Figure 1 in more detail, the simple form of gamma-corrector circuit there shown utilizes, in accordance with the invention, a signal translating device having a non-linear plate load for producing a desired amplitude predistortion in the output signals thereof, and a degenerative, unidirectional D.-C. feedback path for deriving control signals from the output signals of the signal translating device, and for feeding back these control signals to the signal translating device to further control the output signal.

In the present instance, the signal translating device comprises the triode vacuum tube 1, hereinafter designated the driver tube, while the non-linear plate load therefor comprises the triode tube 2 having its discharge path in series with that of driver-tube 1 by virtue of a connection between the cathode of the load tube and the plate of the driver tube. Positive potential is supplied to this series combination of tubes from a source designated B+. Tube 1 is provided with a cathode self-biasing resistor 3, while load tube 2 may be shunted by a resistor 4, the purpose of which will be described hereinafter.

Television signals applied to the grid of driver tube 1, by way of coupling capacitor 6 and series resistor 7, are then reproduced, with the desired amplitude predistortion, at the plate of driver tube 1, which is connected to the output terminal 8 of the system. In addition there is provided, in accordance with our invention, the degenerative, unidirectional D.-C. feedback path connected between the output terminal 8 and the control grid of driver tube 1 and comprising diode 9, the anode of which is connected to output terminal 8, together with the diode load circuit connected to the cathode of diode 9. This load circuit comprises potentiometer 10 and resistors 11 and 12, connected in series between the cathode of diode 9 and a source of negative potential designated C−, and a shunt capacitor 14 connected to ground, as well as suitable connections from the diode load to the grids of tubes 1 and 2. A filter capacitor 15 is also preferably provided between the grid of tube 2 and ground.

The mode of operation of the embodiment of the invention shown in Figure 1 will now be described with particular reference to the graphical representations of Figure 2, in each of which the ordinates represent signal voltages and the abscissae represent time. It will be understood that these graphs are for purposes of explanation only, and are not necessarily quantitatively indicative of the precise voltage and time relationships actually existing in a practical circuit.

First, it will be explained in what manner the system will operate if the grids of tubes 1 and 2 are returned to points of fixed bias, such as zero volts and −7 volts respectively for example, and a standard television signal containing image-representing portions and negatively-directed blanking portions, but without synchronizing pulses, is applied to the grid of triode 1 by way of the coupling capacitor 6 and oscillation-suppressing resistor 7. This input signal may have the general form shown at A in Figure 2, wherein $e_{k10}$ represents the quiescent cathode voltage of tube 1, $e_{g10}$ represents the quiescent bias voltage of tube 1, $e_{g1}$ is the wave-form of the signal applied to the grid of tube 1, and $t_B$ indicates the blanking interval in the signal.

The input signal wave form $e_{g1}$ is balanced about the grid bias voltage line, and the blanking level of the input signal therefore varies in response to changes in the average value of the signal which may occur because of changes in the composition of the television image, for example.

Tube 1 then operates as an amplifier, with tube 2 and shunt resistor 4 as the plate load thereof, producing a corresponding signal at output terminal 8, which, however, will differ somewhat in form from the input signal because of the gamma-correction provided by the non-linear plate load circuit.

Figure 2:
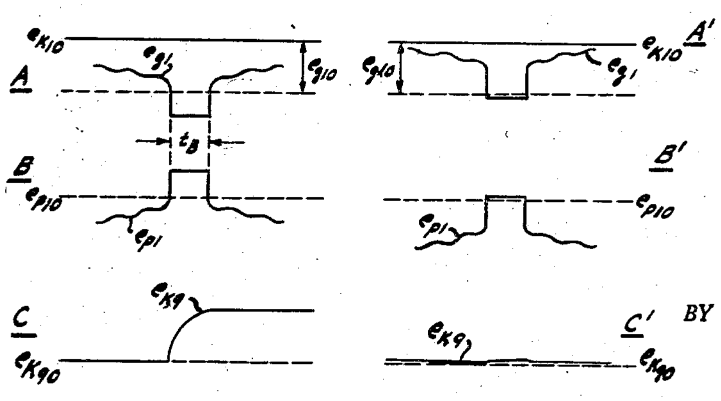
Figure 2 is a series of graphical representations which will be referred to in explaining the mode of operation of the invention.

This output voltage is represented at B of Figure 2, wherein $e_{p10}$ represents the quiescent plate voltage at tube 1 and $e_{p1}$ represents the signal wave form at the plate of tube 1. In the present instance, this signal is balanced about the quiescent plate voltage, and accordingly the blanking level extends above the quiescent plate voltage level by an amount depending upon the average value of the television signal.

When, during the blanking portions of the television signal, the plate voltage of tube 1 rises momentarily above its quiescent value, diode 9 conducts, charging condenser 14 during the interval of conduction. This situation is represented at C of Figure 2, wherein $e_{k90}$ represents the quiescent cathode voltage of diode 9, and $e_{k9}$ represents the signal wave form at that cathode. It will be seen that when the signal at the plate of triode 1 lies below the quiescent plate voltage, there is no conduction in diode 9 and therefore no signal at the cathode thereof, but, during the blanking interval $t_B$, the voltage at the cathode of diode 9 increases exponentially and substantially to the full plate voltage of the diode. Due to the relatively long time constant of the cathode circuit of diode 9, provided by capacitor 14 and the associated resistive elements 10, 11 and 12, the voltage of the cathode of diode 9 will remain substantially at its newly-acquired value during the intervals between successive pulses.

Now when, in accordance with our invention, the grid of driver tube 1 is supplied from a tap point between resistors 11 and 12 in the degenerative D.-C. feedback path, as shown in Figure 1, rather than being returned to a fixed bias source as was assumed above, the voltage developed at the cathode of diode 9 operates to oppose the above-described departures of the plate voltage of driver tube 1 above its quiescent value. Thus, whenever the blanking level of the television signal at the plate of tube 1 tends to depart in a positive direction from the quiescent plate voltage value, a positive control voltage indicative of this departure is developed at the cathode of diode 9 and supplied to the grid of triode 1, thereby increasing the current through tube 1 so as to reduce the direct voltage at the plate of tube 1 until the blanking level no longer extends substantially above the quiescent plate voltage level.

The signal at the plate of triode 1, and at the output terminal 8, therefore occupies the position indicated at B′ of Figure 2, the blanking level being automatically maintained at a position only slightly above the quiescent plate voltage value despite variations in the composition of the television signal.

The voltage of the cathode of diode 9 is then as represented at C′ of Figure 2, being substantially equal to the quiescent value thereof, but tending to charge up slightly during blanking intervals and to decay slightly between such times.

Ordinarily the positive voltage fed back to the grid of tube 1 will then be such as to cause the blanking level to correspond substantially with the quiescent bias voltage of the grid of tube 1, as represented at A′ of Figure 2.

As is indicated in these figures, the primary function of the feedback path provided in accordance with the invention is to maintain the blanking level at the plate of tube 1, and hence at the cathode of tube 2, at a value substantially equal to the quiescent plate voltage of tube 1 despite variations in the content of the television signal. Furthermore, since the feedback path is responsive to direct current changes, variations in the plate voltage of tube 1, which might tend to occur in response to variations in the supply voltages designated B+ and C−, are also counteracted by the degenerative operation of the feedback path.

However, it will be appreciated that the blanking level at output terminal 8 will generally be slightly higher than the quiescent plate voltage of tube 1, as represented at B′ of Figure 2, so as to provide sufficient current through diode 9 to maintain capacitor 14 in its fully charged condition. The extent of this slight departure depends upon the gain of the feedback loop, and is relatively small because of the substantial gain provided by tube 1.

Thus far it has been assumed that the grid of the load tube 2 is supplied with bias voltage from a source of nominally fixed potential, as in prior art circuits. Such an arrangement suffers both from the possibility that the potential supplied to the grid may be subject to fortuitous variations unless elaborate countermeasures are taken, and from the possibility that, should the blanking voltage at the cathode of the load tube 2 vary somewhat for any reason, then maintaining the grid of the load tube at a fixed potential will result in variations in the grid-to-cathode voltage of the load tube during blanking intervals, which is the principal variation to be avoided;

To obviate this source of instability in accordance with the invention, the grid of the load tube is returned to the adjustable tap on the relatively low-valued potentiometer 10. Since the combined resistance of the remaining resistors 11 and 12 is many times greater than the resistance between the potentiometer tap and the cathode of diode 9, the voltage at the potentiometer tap point follows substantially completely any variations in the cathode voltage of diode 9 which may remain despite the above-described automatic control. However, even though the resistance between the tap on potentiometer 10 and the cathode of diode 9 is relatively small, the required negative bias for the grid of tube 2 is obtained through the use of a relatively large negative supply voltage from the source designated C—. As an example, the resistance between the tap on potentiometer 10 and the cathode of diode 9 may be only about one-fortieth of the resistance between that point and the negative voltage supply point. As a result, only about one-fortieth of any residual variations in the blanking level at the cathode of tube 2 will affect the grid-to-cathode voltage of tube 2. Similarly, about one-fortieth of the direct voltage between the cathode of diode 9 and C— is supplied as bias to the grid of tube 2. Since the cathode of diode 9 may typically be at 150 volts positive, while the voltage from the source C— may be about 150 volts negative, a bias of approximately 7 volts may thus be supplied to the grid of tube 2.

If either or both of the positive and negative supply voltages should vary somewhat from their usual values, the fact that the grid of tube 1 is connected to a point in the D.-C. feedback path which is responsive to variations in either the positive supply voltage or the negative supply voltage, and that such variations are passed through driver tube 1 in a sense to oppose the effects of such variations upon the cathode voltage of tube 2, results in degeneration of changes due to variations in supply voltages. Even if such changes in cathode voltage are not completely eliminated, their effects upon the grid-to-cathode voltage of the load tube are minimized by the above-described connection of the grid of the load tube to the feedback path. As a result of these methods of stabilization, the circuit is highly dependable in operation.

In utilizing the above-described circuit, the choice of components and values of the parameters thereof will be governed in accordance with the requirements of the particular application. In one use of the device of Figure 1 as a gamma-corrector for a standard monochrome television signal applied to the input terminals thereof with the blanking level negatively-extending, the following considerations were found to be pertinent to the proportioning of the various elements of the system.

First, in choosing the driver tube 1 and the load tube 2, and in selecting the operating points therefor, it is noted that the driver tube 1 is similar to other amplifiers in the television system with regard to its capability of introducing gamma-distortion of the type which the non-linear load tube 2 is provided to correct. In the prior art arrangements, such as the Oliver circuit discussed hereinbefore, the driver tube 1 comprises a pentode having a substantially linear amplitude characteristic, and the degree of gamma-correction afforded by the circuit therefore depends substantially only upon the non-linearity of the load device for the driver tube. However, in the arrangement of Figure 1, in which we have avoided the difficulty of supplying a constant screen voltage to a pentode driver tube by the substitution of a triode, the curvature of the plate-current vs. grid-bias transfer characteristic of the driver tube 1 opposes the correction provided by the load tube 2. Thus, if tubes 1 and 2 are identical and are operated under identical conditions, load tube 2 will just compensate for the distortion introduced by driver tube 1, and there will be no net gamma correction afforded by the circuit.

Therefore, to accomplish a net gamma correction of the television signal, the driver tube 1 should be operated at a relatively high current point on its characteristic, where this latter characteristic is substantially linear, while the load triode 2 should be operated at a lower current point approaching the vicinity of cut-off where the curvature of the tube characteristic is more rapid. To provide this desired operation of the driver tube 1 at relatively high current values, the resistor 4 which shunts the load tube 2 may have a resistance substantially less than the D.-C. resistance provided by tube 2, so that the current through driver tube 1 is substantially greater than that through the load tube 2. As a result, similar biases applied to tubes 1 and 2 will provide operation in a more linear region for tube 1 than for tube 2. In actual operation, the driver tube is of course operated with a relatively low bias, while the load tube is operated with a relatively higher bias. Further linearization of the tube 1 characteristic is provided by the cathode degeneration produced by resistor 3.

The capacity of capacitor 14 is preferably such as to provide a time constant, in conjunction with the resistances of potentiometer 10, resistor 11 and resistor 12, which is long compared to the interval between successive blanking intervals. This permits the cathode voltage of diode 9 to remain at substantially its full value between successive blanking intervals, and therefore to provide the desired peak-detecting action. Capacitor 15 is sufficiently large to by-pass any high frequency components present in the signal of the cathode of diode 9, and therefore to provide the grid of load tube 2 with a substantially constant bias voltage.

In this particular application of our invention, typical values for the various circuit parameters of the system of Figure 1, and approximate values of the potentials and currents existing at several critical points in the circuit, may be as follows:

| | |
|---|---|
| Driver tube 1 | One section of a type 12AV7 twin-triode vacuum tube. |
| Load tube 2 | One section of a type 12AV7 twin-triode vacuum tube. |
| Resistor 3 | 220 ohms. |
| Resistor 4 | 18,000 ohms. |
| Capacitor 6 | .5 microfarad. |
| Resistor 7 | 100 ohms. |
| Diode 9 | One section of a type 12AV7 twin-triode, with plate and grid connected together to form the anode. |
| Potentiometer 10 | 200,000 ohms. |
| Resistor 11 | 1.8 megohms. |
| Resistor 12 | 2 megohms. |
| Capacitor 14 | .5 microfarad. |
| Capacitor 15 | .01 microfarad. |
| B+ | 300 volts. |
| C— | —150 volts. |
| Quiescent plate current of tube 1 | Approximately 8 milliamperes. |
| Quiescent current of load tube 2 | Approximately 0.4 milliampere. |
| Quiescent plate voltage of driver tube 1 | Approximately 150 volts. |
| Quiescent potential of grid of tube 1 | Approximately 0 volts. |
| Quiescent voltage of cathode of tube 1 | Approximately 7.8 volts. |
| Quiescent grid-to-cathode voltage of tube 2 | Approximately —7 volts. |

It is to be understood that the quiescent values given above refer to the values which exist in the absence of applied input signals.

Figure 3:
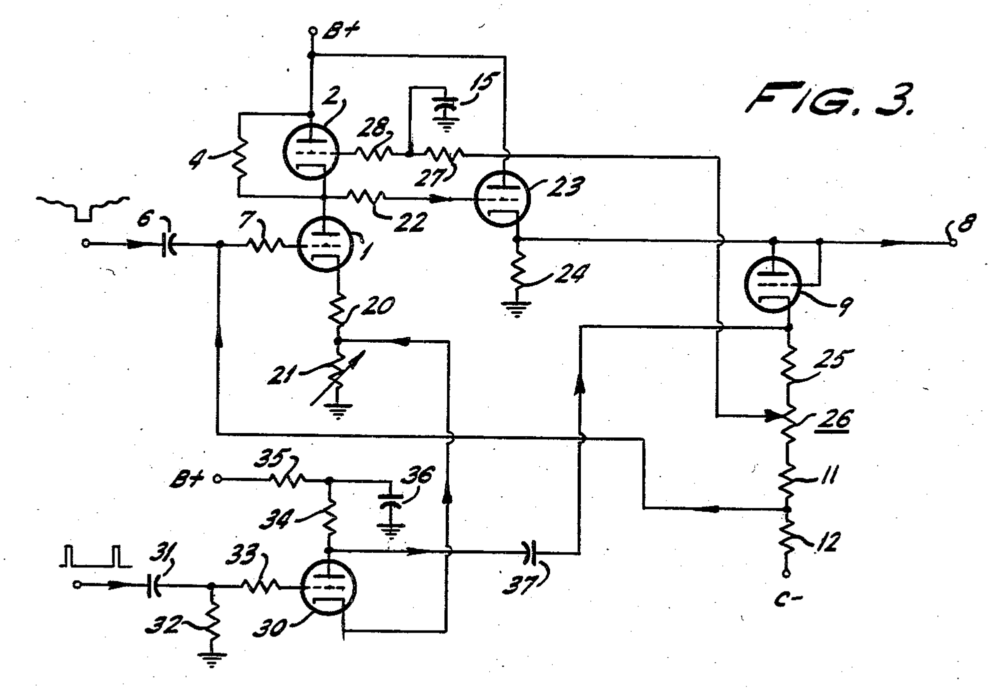
Figure 3 represents a preferred embodiment of the invention which we have found to be particularly useful in certain applications.

The system shown in Figure 3 represents an improved embodiment of the invention, with particular regard to the frequency response thereof and the elimination of possible clipping of the portions of the signal representative of dark parts of the image. It will be appreciated that, in the system of Figure 1, the frequency response of the system is limited by the substantial load resistance provided by the load tube 2, in combination with the circuit capacity normally associated both with the diode 9 and with the amplifier or other energy utilization device to which the output signals of the gamma corrector are supplied. In the arrangement of Figure 3, this frequency limit is increased substantially by the use of a cathode-follower type circuit, in a manner to be described in detail hereinafter. It will also be understood that, in the absence of a substantial amount of "set-up" in the television signal, television signals representing darker portions of the image may approach closely the blanking level, and, since diode 9 generally conducts somewhat below the blanking level, it may also tend to conduct to some extent during the dark extremes of the image-representing signals. This conduction corresponds to a substantial short-circuiting of these portions of the image-representing signal, resulting in a clipping action which may remove intelligence as to such darker portions of the image.

In the circuit of Figure 3, this difficulty is overcome in large measure by an arrangement which operates to increase momentarily the voltage across the diode in the feed-back path during blanking intervals so that, in effect, leveling of the television signal in the plate circuit of the driver tube can be caused to occur precisely at blanking level, or even somewhat above. This latter arrangement finds special application in instances in which the image-representing signal actually possesses values on both sides of the blanking level, making direct leveling on blanking signals impossible.

Referring now specifically to Figure 3, wherein like numerals denote like parts, input signals may again be applied through coupling capacitor 6 and oscillation-suppressing resistor 7 to the grid of the driver tube 1, which has in its plate circuit the load tube 2 and the shunt resistor 4 making connection to the source of positive potential designated B+. The cathode of the driver tube 1 is again provided with a cathode resistor, which in the present instance is preferably divided into two portions, a fixed portion 20 and a variable portion 21, for reasons which will become apparent hereinafter. The plate of tube 1 is connected by way of another oscillation-suppressing resistor 22 to the grid of the cathode-follower triode tube 23, the plate of which is supplied directly with B+ voltage, and the cathode of which is provided with an appropriate load resistor 24 connected to ground. The operation of tube 23 and its associated circuits is conventional and in accordance with the usual operation of cathode followers, except that the value of the cathode load resistor is higher than is usually necessary. Output signal is taken from the cathode of tube 23 and supplied to the plate of diode 9.

As in the circuit of Figure 1, the plate of diode 9 is connected to the signal output terminal 8, while the cathode of diode 9 is connected to one end of a load circuit, comprising a resistive divider network connected at its opposite end to the source of negative potential designated C—. This divider is provided with a pair of taps, one for supplying bias to the grid of the load tube 2, and the other for supplying bias to the grid of driver tube 1. Preferably a fixed resistor 25 is located between one terminal of a potentiometer 26 and the cathode of diode 9 to provide a predetermined minimum resistance between the tap of potentiometer 26 and the cathode of diode 9 for reasons which will become apparent hereinafter. Furthermore, a series filtering resistor 27, and a parasitic-oscillation suppressing resistor 28, are preferably included in series with the grid of load tube 2 in the manner shown.

An important feature of the arrangement of Figure 3 lies in the provision of the following means for momentarily increasing the current through diode 9 during each blanking interval so as to prevent the above-described clipping of the image-representing signals. Positive horizontal synchronizing impulses, timed to occur during blanking intervals, are supplied to the grid of a phase-splitting triode 30 by way of an input circuit comprising coupling capacitor 31, grid-leak resistor 32 and isolating resistor 33. Variations in the grid voltage of tube 30, produced in response to the positive horizontal synchronizing pulses, produce corresponding positive and negative voltage pulses at the cathode and plate, respectively, of that tube.

The relative magnitudes of the plate and cathode pulses of tube 30 depend upon the effective plate and cathode circuit A.-C. impedances. The plate circuit of tube 30 includes the A.-C. load resistor 34, which is connected to a voltage-dropping resistor 35 and an appropriate A.-C. bypassing condenser 36, the other terminal of dropping-resistor 35 being supplied from the positive potential source B+. This arrangement provides a lowered value of plate supply voltage for the triode 30, and, due to the bypassing of the dropping resistor, the resistor 34 comprises the entire A.-C. load in the plate circuit of tube 30. A capacitor 37 provides a connection between the plate of tube 30 and the cathode of diode 9. The cathode load of tube 30 is the variable resistor in the cathode of driver tube 1, namely variable resistor 21.

The operation of the latter portion of the circuit of Figure 3 is as follows. Synchronizing pulses are applied to the cathode of driver tube 1 in positive polarity, and, in the absence of pulses applied to the cathode of diode 9 from the plate of tube 30, would be reproduced with the same positive polarity at the plate of driver tube 1, at the cathode of cathode-follower 23 and at the plate of diode 9. However, pulse signals of opposite polarity and identical magnitude are produced simultaneously in the plate circuit of tube 30 and applied to the cathode of diode 9. It will be appreciated that, by this operation, the resistance of driver tube 1 is momentarily increased, while the effective resistance of the cathode circuit of diode 9 is momentarily decreased by the pulsing of capacitor 37, resulting in a momentary diversion of current from tube 1 to diode 9. As a result, relatively large pulses of current are produced through diode 9 during horizontal synchronizing pulse intervals without modifying the voltage at output terminal 8. In this way, sufficient current is provided through diode 9 to charge completely the capacitor in the cathode circuit of diode 9 during horizontal synchronizing impulse periods so that conduction during image-representing portions of the television signal does not occur and clipping of the image-representing signals by diode conduction is therefore prevented.

It is noted that, to adjust this system so as to prevent disturbance of the output signal at terminal 8 by this pulsing arrangement, the variable resistor 21 in the cathode of driver tube 1 should be adjusted until each blanking pulse at output terminal 8 is of substantially uniform amplitude throughout the blanking interval.

It will now be apparent that the fixed resistor 25 in the cathode circuit of diode 9, and the series filter resistor 27 in series with the grid of load tube 2, are preferably utilized to prevent the synchronizing impulse signals applied to the cathode of diode 9 from affecting the potential at the grid of load tube 2.

With the circuit shown in Figure 3, gamma-correction exponent values of $$\frac{1}{2.75}$$

are readily realized, with a frequency response for the entire circuit which is substantially uniform from 0 to 4 megacycles per second.

The values of the circuit parameters of Figure 3 necessary to obtain the operation indicated above, in one particular embodiment, may eb as follows:

| | |
|---|---|
| Tube 1 | One section of a 12AV7 twin-triode vacuum tube. |
| Tube 2 | One section of a 12AV7 twin-triode vacuum tube. |
| Resistor 4 | 18,000 ohms. |
| Capacitor 6 | .47 microfarad. |
| Resistor 7 | 100 ohms. |
| Tube 9 | One section of a 12AV7 twin-triode, diode disconnected. |
| Resistor 11 | 1.8 megohms. |
| Resistor 12 | 2 megohms. |
| Capacitor 15 | .01 microfarad. |

| | |
|---|---|
| Resistor 20 | 100 ohms. |
| Rheostat 21 | 0–200 ohms. |
| Resistor 22 | 100 ohms. |
| Tube 23 | One section of a 12AV7 twin-triode vacuum tube. |
| Resistor 24 | 15,000 ohms. |
| Resistor 25 | 100,000 ohms. |
| Potentiometer 26 | 0 to 100,000 ohms. |
| Resistor 27 | 1 megohm. |
| Resistor 28 | 100 ohms. |
| Tube 30 | One section of a 12AV7 twin-triode vacuum tube. |
| Capacitor 31 | .1 microfarad. |
| Resistor 32 | 1 megohm. |
| Resistor 33 | 100 ohms. |
| Resistor 34 | 330 ohms. |
| Resistor 35 | 1 megohm. |
| Capacitor 36 | .47 microfarad. |
| Capacitor 37 | .22 microfarad. |
| B+ | 300 volts. |
| C− | −150 volts. |
| Synchronizing pulse amplitude | 4 volts at capacitor 31. |

Although the invention has been described with reference to particular embodiments thereof, it will be appreciated that it is susceptible of embodiment in a variety of forms without departing from the spirit of the invention. Thus, the driver tubes in the circuits of Figures 1 and 3 need not be triodes, but may in some instances comprise appropriately-operated pentode vacuum tubes, for example, or may even be suitable semi-conductor devices. When the device used as the driver does not automatically provide phase reversal of signals, it will of course be necessary to provide phase reversal of the feedback signal by some other conventional means. Further, although the feedback signal has been shown applied to the same tube element as is the input signal, it will be apparent that it may be applied in other ways to control the D.-C. component of the output signal. For example, it may be applied to another control element of the driver tube, such as the cathode, or to a separate tube in parallel with the driver tube, provided that the proper phase of signal for degenerative action is maintained.

Similarly, the load tube 2 need not be a vacuum tube but may comprise any of a variety of non-linear devices, the exact form selected depending upon the particular application and the amplitude distortion which is desired for the signal. Further, the shunt resistor in parallel with the load tube will not always be necessary, since it will in some instances be possible to choose the load device so that it will provide in itself the entire desired load impedance.

It is also noted that the asymmetrically-conductive device 9, which may be a vacuum tube diode or crystal diode for example, need not in all applications be arranged in the polarity shown. For example, in some instances the cathode of the diode may be connected to the output terminal of the device, and the plate to the resistive feedback network. In this latter instance, a television signal with blanking directed positively at the grid of the driver tube will be appropriately leveled at the output of the device, although the gamma correction provided will be greater than unity with the other circuit parameters as shown in Figure 1, rather than fractional.

With regard to the embodiment of Figure 3, it is also obviously possible to modify that arrangement so as to apply synchronizing pulses only to the cathode of driver tube 1, so as to provide conduction of diode 9 at a level which is always above the region into which image-representing signals may extend, although this latter method has been found to be more critical in adjustment and maintenance.

We claim:

1. In a system for maintaining the blanking level of a television signal at a predetermined value: signal translating means having an input terminal and an output terminal and being controllable to vary the D.-C. component of the signal at said output terminal, said signal translating means comprising an electron discharge device having at least an anode, a cathode, and a current-controlling electrode supplied with said television signal, said anode being direct-coupled to said output terminal, and an asymmetrically-conductive device and a reactive element connected in a feedback path from said output terminal to said signal translating means for controlling said means to oppose departures of said blanking level from said predetermined value, said asymmetrically-conductive device comprising a diode, said feedback path comprising said diode and a resistive element direct-coupled in series, and a capacitive element effectively in shunt with said resistive element, said diode being direct-coupled to said output terimnal and said resistive element being direct-coupled to said current-controlling electrode of said electron discharge device.

2. The system of claim 1, comprising additional means for producing simultaneously a pair of pulses during each of said blanking intervals, and for applying one of said pair of pulses to said diode by way of said signal translating means and the other of said pair of pulses to said diode by way of said capacitive element, thereby to produce a pulse of additional current through said diode during each of said blanking intervals.

3. The system of claim 2, comprising in addition a source of horizontal synchronizing pulses, and means for producing said pairs of pulses simultaneously with the occurrences of said synchronizing pulses.

4. In a system useful for controlling the amplitude distortion of an input signal: apparatus comprising a signal translating device and a load device therefor, said load device being controllable in response to a first control signal to control the impedance provided thereby, said signal translating device being responsive to said input signal to produce an output signal across said load device, said apparatus being controllable to vary the D.-C. component of said output signal in response to a second control signal; a unidirectional, degenerative, D.-C. feedback circuit supplied with said output signal; and direct-current connections to said feedback circuit for providing control signals to said load device and to said signal translating device.

5. The system of claim 4, in which said feedback circuit comprises an asymmetrically-conductive device supplied with said output signal, a resistive element in series with said asymmetrically-conductive device, and a reactive element associated with said resistive element, and in which said connections are made to said resistive element.

6. In a gamma-correcting circuit for television signals: first and second discharge devices, each having at least an anode, a cathode and a control grid, said anode of said first device being direct-coupled to said cathode of said second device; a third discharge device having at least anode and cathode electrodes, one of said electrodes being direct-coupled to said anode of said first device; a resistive element and a reactive element connected to the other electrode of said third discharge device; first and second taps upon said resistive element, the resistance between said first tap and said other electrode of said third discharge device being substantially greater than the resistance from said second tap to said other electrode; and direct connections from said first and second taps to said control grids of said first and second discharge devices respectively.

7. The circuit of claim 6, comprising in addition a source of supply voltage substantially negative with respect to the potential of said cathode of said first discharge device, and in which said resistive element is connected to said source at the end nearer said first tap.

8. The system of claim 6, in which said first and second discharge devices comprise triode vacuum tubes.

9. The system of claim 6, in which said reactive element comprises a capacitor in shunt with said resistive element.

10. The system of claim 9, comprising in addition a source of auxiliary pulses occurring during blanking intervals in said television signals, and means responsive to said pulses for simultaneously increasing the D.-C. resistance of said first discharge device and for applying a negative pulse to a terminal of said capacitor other than that connected to said third discharge device, thereby to produce additional pulses of current through said diode without introducing variations in the voltage at said electrode of said third discharge device which is connected to said anode of said first discharge device.

11. A system for maintaining the blanking level of a television signal at substantially a predetermined voltage level, said system comprising: means for generating a television signal containing blanking pulses and intelligence-representing portions occurring between said blanking pulses, said signal being of substantially constant value throughout each of said blanking pulses but tending to assume differing values for different ones of said blanking pulses; an active signal-translating device having an input terminal and an output terminal and capable of providing signal gain between said input and output terminals, said device being responsive to said signal applied to said input terminal to produce at said output terminal a corresponding output signal containing blanking pulses and intelligence-representing portions, said device also being responsive to variations in the bias voltage at said input terminal to vary the D.-C. component of said output signal; means including a source of supply voltage and a direct-current connection from said source to said output terminal for supplying said device with operating potentials; a direct-current transmissive peak detector circuit connected directly to said output terminal for deriving a control voltage varying substantially as said blanking level of said output signal, said peak detector having a time-constant longer than the intervals between said blanking pulses; and means for utilizing said control voltage in degenerative phase as said bias voltage for said input terminal of said signal-translating device.

12. In a system for maintaining predetermined, intermittently-recurrent portions of a signal at a substantially fixed, predetermined voltage level, despite substantial variations in the waveform of said signal and in the static operating conditions of said system: a circuit comprising a signal-translating device having an input terminal and an output terminal, said device being responsive to a signal at said input terminal to produce a corresponding output signal at said output terminal, said circuit having a control element responsive to bias variations to vary the D.-C. component of said output signal; and means responsive to said output signal for producing a control signal indicative of departures of said predetermined portions of said output signal, in a predetermined direction, from said predetermined voltage level and for utilizing said control signal to control said bias so as to oppose said departures of said predetermined signal portions, said means comprising a degenerative, unidirectional, direct-current signal feedback path connecting said output terminal to said control element and having a time-constant longer than the intervals between said signal portions for causing said control to persist throughout said intervals, said feedback path including an asymmetrically-conductive device in series therein, means for modifying the current through said asymmetrically-conductive device by a predetermined amount, during intervals coexistent with the occurrence of said predetermined signal portions, and apparatus for producing a pair of simultaneously-occurring, oppositely-directed pulses during each of said intervals and for utilizing said pulses momentarily to increase the current through said asymmetrically-conductive device during said intervals.

13. In a system for maintaining predetermined, intermittently-recurrent portions of a signal at a substantially fixed, predetermined voltage level, despite substantial variations in the waveform of said signal and in the static operating conditions of said system: a circuit comprising a signal-translating device having an input terminal and an output terminal, said device being responsive to a signal at said input terminal to produce a corresponding output signal at said output terminal, said circuit having a control element responsive to bias variations to vary the D.-C. component of said output signal; and means responsive to said output signal for producing a control signal indicative of departures of said predetermined portions of said output signal, in a predetermined direction, from said predetermined voltage level and for utilizing said control signal to control said bias so as to oppose said departures of said predetermined signal portions, said means comprising a degenerative, unidirectional, direct-current signal feedback path connecting said output terminal to said control element and having a time-constant longer than the intervals between said signal portions for causing said control signal to persist throughout said intervals, said feedback path including an asymmetrically-conductive device in series therein and a cathode-follower circuit having its signal path in series between said output terminal and said asymmetrically-conductive device for improving the frequency response of the system.

References Cited in the file of this patent

UNITED STATES PATENTS

| | | |
|---|---|---|
| 2,190,753 | Browne et al. | Feb. 20, 1940 |
| 2,259,520 | Freeman | Oct. 21, 1941 |
| 2,259,538 | Wheeler | Oct. 21, 1941 |
| 2,362,503 | Scott | Nov. 14, 1944 |
| 2,482,803 | Smith et al. | Sept. 27, 1949 |
| 2,498,839 | Hayward | Feb. 28, 1950 |
| 2,517,863 | Froman | Aug. 8, 1950 |
| 2,520,012 | Montgomery | Aug. 22, 1950 |
| 2,572,179 | Moore | Oct. 23, 1951 |
| 2,632,064 | Onia | Mar. 17, 1953 |

UNITED STATES PATENT OFFICE
CERTIFICATE OF CORRECTION

Patent No. 2,850,627 September 2, 1958

Robert C. Moore, et al.

It is hereby certified that error appears in the printed specification of the above numbered patent requiring correction and that the said Letters Patent should read as corrected below.

Column 10, line 66, for "may eb" read -- may be --; line 72, for "diode discon-" read -- diode con- --; column 12, line 11, for "terimnal" read -- terminal --.

Signed and sealed this 23rd day of February 1960.

(SEAL)
Attest:

KARL H. AXLINE
Attesting Officer

ROBERT C. WATSON
Commissioner of Patents